(12) United States Patent
Riley

(10) Patent No.: US 8,464,260 B2
(45) Date of Patent: Jun. 11, 2013

(54) CONFIGURATION AND ASSOCIATION OF A SUPERVISORY VIRTUAL DEVICE FUNCTION TO A PRIVILEGED ENTITY

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1467 days.

(21) Appl. No.: 11/930,854

(22) Filed: Oct. 31, 2007

(65) Prior Publication Data

US 2009/0113430 A1  Apr. 30, 2009

(51) Int. Cl.
*G06F 9/48* (2006.01)
*G06F 9/455* (2006.01)
*G06F 13/20* (2006.01)

(52) U.S. Cl.
USPC ............................ 718/101; 718/1; 710/313

(58) Field of Classification Search
None
See application file for complete search history.

(56) References Cited

U.S. PATENT DOCUMENTS

| 6,594,721 | B1 * | 7/2003 | Sakarda et al. | 710/304 |
| 6,615,264 | B1 | 9/2003 | Stoltz et al. | |
| 7,478,178 | B2 * | 1/2009 | Torudbakken et al. | 710/31 |
| 2006/0031664 | A1 * | 2/2006 | Wilson et al. | 713/1 |
| 2006/0195617 | A1 | 8/2006 | Arndt et al. | |
| 2006/0253619 | A1 * | 11/2006 | Torudbakken et al. | 710/31 |
| 2007/0183393 | A1 | 8/2007 | Boyd | |
| 2007/0240018 | A1 * | 10/2007 | Nalawadi et al. | 714/23 |
| 2008/0148032 | A1 * | 6/2008 | Freimuth et al. | 713/1 |

OTHER PUBLICATIONS

David Kahn, Single Root IO Virtualization, PCI-SIG Developers Conference 2006.*
Renato Recio, Single Root Resource Discovery and Allocation, PCI-SIG Developers Conference 2006.*
Michael Krause and Renato Recio, I/O Virtualization and Sharing, PCISIG Developers Conference 2006.*
Richard Solomon, I/O Virtualization Overview, PCI-SIG Developers Conference 2006.*
Barham et al., Xen and the Art of Virtualization, Proceeding SOSP '03 Proceedings of the nineteenth ACM symposium on operating systems principles (2003).*
Budruk et al., PCI Express System Architecture, by Mindshare, copyrighted 2003.*
Abramson et al., Intel Virtualization Technology for Directed I/O, Intel Technology Journal, vol. 10, Issue 3, 2006.*

\* cited by examiner

*Primary Examiner* — Meng An
*Assistant Examiner* — Benjamin Wu

(57) ABSTRACT

A hardware device interface supporting transaction authentication is described herein. At least some illustrative embodiments include a device, including an interconnect interface, and processing logic (coupled to the bus interface) that provides access to a plurality of functions of the device through the interconnect interface. A first transaction received by the device, and associated with a function of the plurality of functions, causes a request identifier within the first transaction to be assigned to the function. Access to the function is denied if a request identifier of a second transaction, subsequent to the first transaction, does not match the request identifier assigned to the function.

21 Claims, 4 Drawing Sheets

CONFIGURATION AND ASSOCIATION OF A SUPERVISORY VIRTUAL DEVICE FUNCTION TO A PRIVILEGED ENTITY

BACKGROUND

In recent years, the use of virtual machine technology has increased significantly. This technology executes software within a host operating system that emulates a real computer, sometimes referred to as the "physical machine." It is this emulation of a physical machine that is sometimes referred to as a "virtual machine." A guest operating system can be run on a virtual machine, and from the perspective of the guest operating system the virtual machine is indistinguishable from a physical machine. Additionally, virtual machine monitoring software (sometimes referred to as a "hypervisor") may be used as a layer between the operating system and multiple virtual machines, allowing multiple operating systems to concurrently run on multiple virtual machines, all supported by a single physical machine. The hypervisor serves as a coordination and arbitration point between each of the virtual machines and the physical machine, ensuring the required isolation between machines. This isolation may be required both for functional reasons (e.g., to avoid resource contention) and for security reasons.

Faster machines and less expensive software have made virtual machine technology both attractive and viable to a range of user that previously might have otherwise overlooked this technology. But as the number of users of virtual machines increases, so do the demands by these users for virtual machines that can perform at a level comparable to their physical counterparts. Meeting these performance demands has proved challenging, due in significant part to the fact that many of the low-level functions of the virtual machines are implemented in software. The software implementation of such functions adds a significant degree of latency and overhead to operations that would be performed in hardware by a corresponding physical machine. The partitioning, allocation and management of single-host resources by the hypervisor also adds overhead that further contributes to the performance disparity between virtual and physical machines.

To overcome some of the above-described latency and overhead issues sometimes associated with hypervisors, hardware-based extensions of the interconnect structures of some computer systems (e.g., extensions to the peripheral component interconnect or PCI) have been developed that allow a guest operating system, running under a hypervisor, to perform direct input and output (I/O) operations on an I/O device that is shared between multiple virtual machines. However, these interconnect extensions lack the types of hardware-based security and protection mechanisms currently available on many processors. Such hardware-based processor mechanisms allow a hypervisor to ensure operational isolation between multiple virtual machines performing operations on the processor, while decreasing the overhead associated with enforcing such isolation when compared to software-based security and protection mechanisms.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as a computer, a portion of a computer, a combination of computers, etc. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

Figure 1:
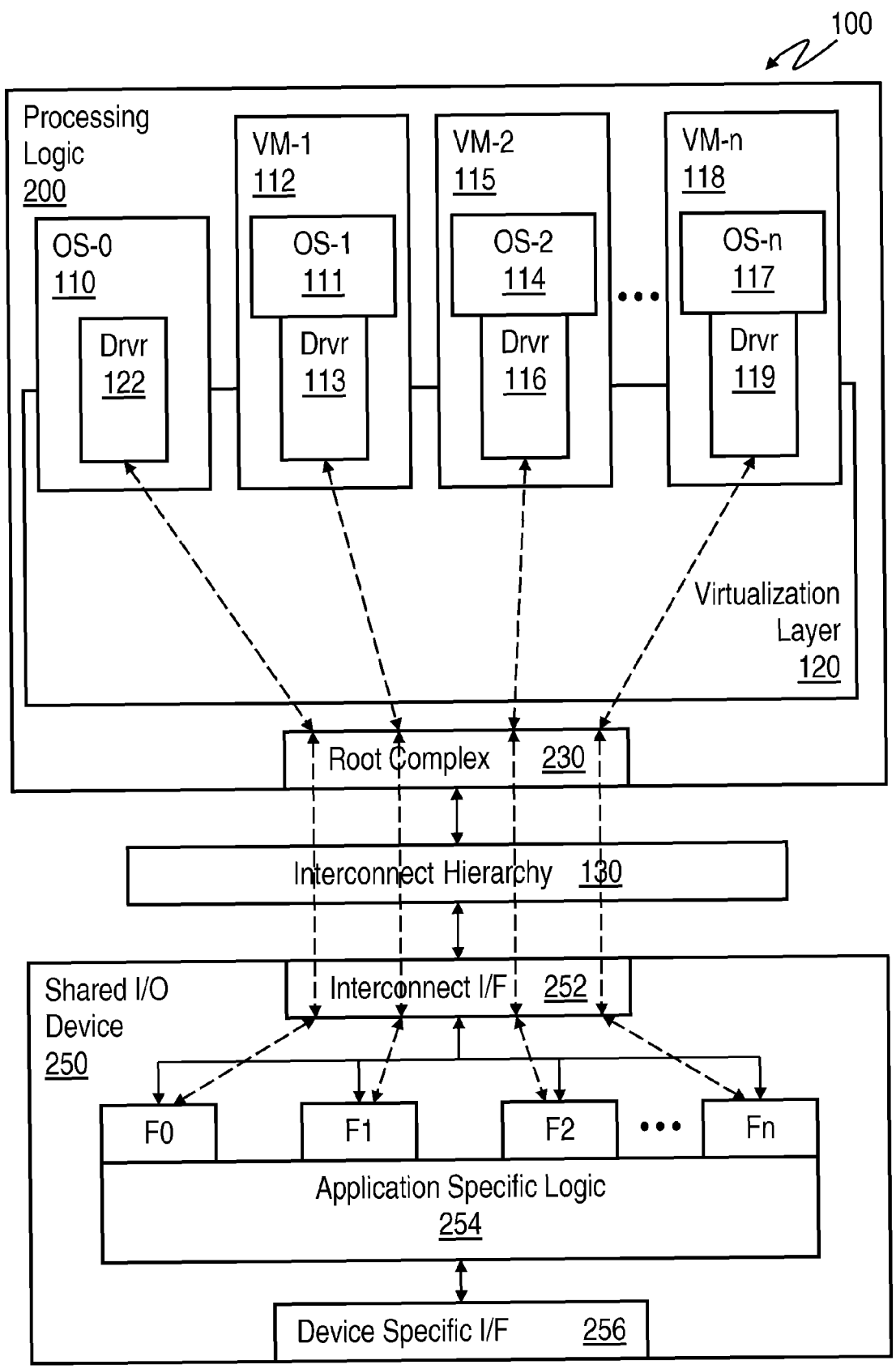
FIG. 1 shows a functional diagram of a computer system that includes multiple virtual machines that interact with a multi-function shared I/O device, in accordance with at least some illustrative embodiments.

FIG. 1 shows a functional representation of a system 100 with a shared input/output (I/O) device 250 capable of supporting multiple virtual machine software programs and constructed in accordance with at least some illustrative embodiments. Multiple virtual machines 112, 115 and 118 execute over and interact with virtualization layer 120, all executing on processing logic 200. Virtualization layer 120 may be a component of basic input and output system (BIOS) software executed by processing logic 200, a component of an operating system (OS) that interacts with hypervisor software executing over the operating system, or a component of an integrated hypervisor operating system (e.g., host hypervisor operating system (OS-0) 110 of FIG. 1). Each of the virtual machines 112, 115 and 118, as well as host hypervisor operating system 110, includes a logical device driver (Drvr 113, 116, 119 and 122), used by each corresponding virtual machine and host OS to provide access to shared I/O device 250 via interconnect hierarchy 130. A guest operating system 111, 114 and 117 (OS-1, OS-2 and OS-3) each executes on virtual machines 112 115 and 118, respectively, and each interacts with interconnect hierarchy 130 via a corresponding logical driver (113, 116 and 119). The host hypervisor operating system 110 similarly interacts with shared I/O device 250 via logical driver 122.

Processing logic 200 includes root complex 230, which couples processing logic 200 to interconnect hierarchy 130 (e.g., an extended peripheral component interconnect (PCI-X) bus, or a PCI express (PCIe) bus) and operates as an interconnect interface between internal components within processing logic 200 and interconnect hierarchy 130. Interconnect hierarchy 130 further couples to interconnect I/F 252 of shared I/O device 250, thus providing a path for the operating systems executing on processing logic 200 to interact with the various functions exposed by shared I/O device 250. Each function represents an instance of shared I/O device 250 (described in more detail below) that operates independently of the other functions, each function including some or all of the capabilities of the device. The dashed lines of FIG. 1 represent the logical paths between each of the operating systems and the corresponding functions (FO through Fn) of shared I/O device 250. Shared I/O device 250 further includes application specific logic 254, coupled to interconnect I/F 252, which implements the functions performed by the device (e.g., network interface functions), and device specific interface 256 (e.g., an Ethernet interface), which also couples to application specific logic 254.

Figure 2:
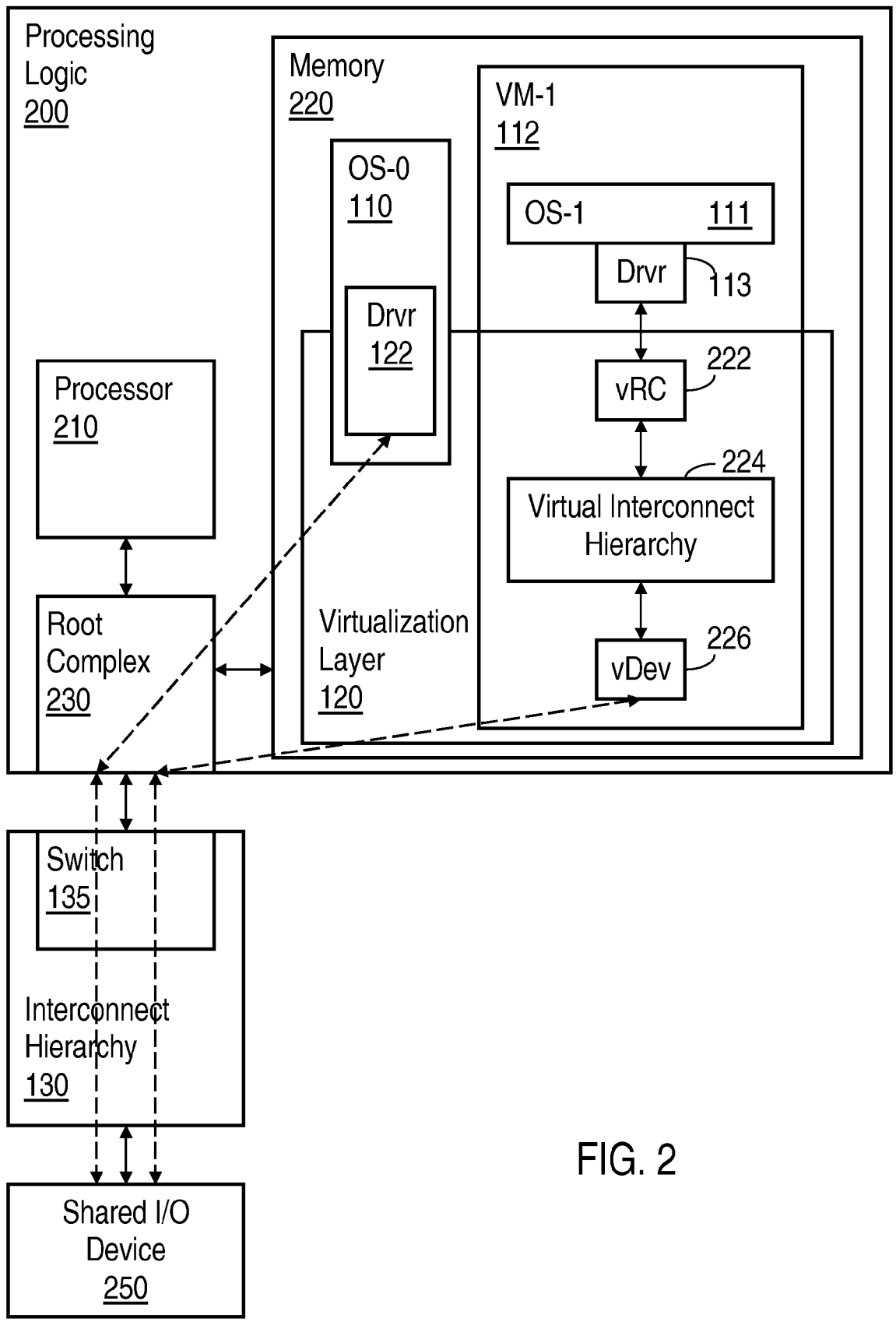
FIG. 2 shows a detailed block diagram of the processing logic of FIG. 1, constructed in accordance with at least some illustrative embodiments.

FIG. 2 shows a detailed block diagram of processing logic 200, suitable to support the system 100 of FIG. 1 and constructed in accordance with at least some illustrative embodiments. Processing logic 200 includes a processor 210, capable of executing software programs loaded onto memory 220. Memory 220 couples to processor 210, via root complex 230, and may be implemented using volatile memory devices (e.g., random access memory or RAM) or non-volatile memory devices (e.g., a hard disk), or combinations of both volatile and non-volatile memory devices. Virtual machine 112 is a software program that is loaded into memory 220 and executes on processor 210 within the operating environment provided by host hypervisor operating system 110. The virtual machine interacts with shared I/O device 250 via virtualization layer 120, which is a component of host hypervisor operating system 110. Although only one virtual machine is shown in FIG. 2, multiple virtual machines may execute concurrently within processing logic 200, as shown in FIG. 1.

Continuing to refer to FIG. 2, host hypervisor operating system (OS-0) 110 also resides within memory 220 and executes on processor 210, interacting with shared I/O device 250 via device driver 122 and virtualization layer 120. Processor 210 couples to root complex 230, which operates as an interconnect interface or bridge between processor 210 and interconnect hierarchy 130 (e.g., a PCI-X bus, or a PCI Express bus), which includes one or more communication packet switches (e.g., switch 135). Virtual machine 112 comprises guest operating system (OS-1) 111, which interacts with a virtualized representation of one or more functions of shared I/O device 250 via device driver (Drvr) 113, virtual root complex (vRC) 222, virtual interconnect hierarchy 224 and virtual device (vDev) 226. Virtual root complex 222, virtual interconnect hierarchy 224 and virtual device 226 are each implemented in software as components of virtual machine 112 in the illustrative embodiment of FIG. 2.

Figure 3:
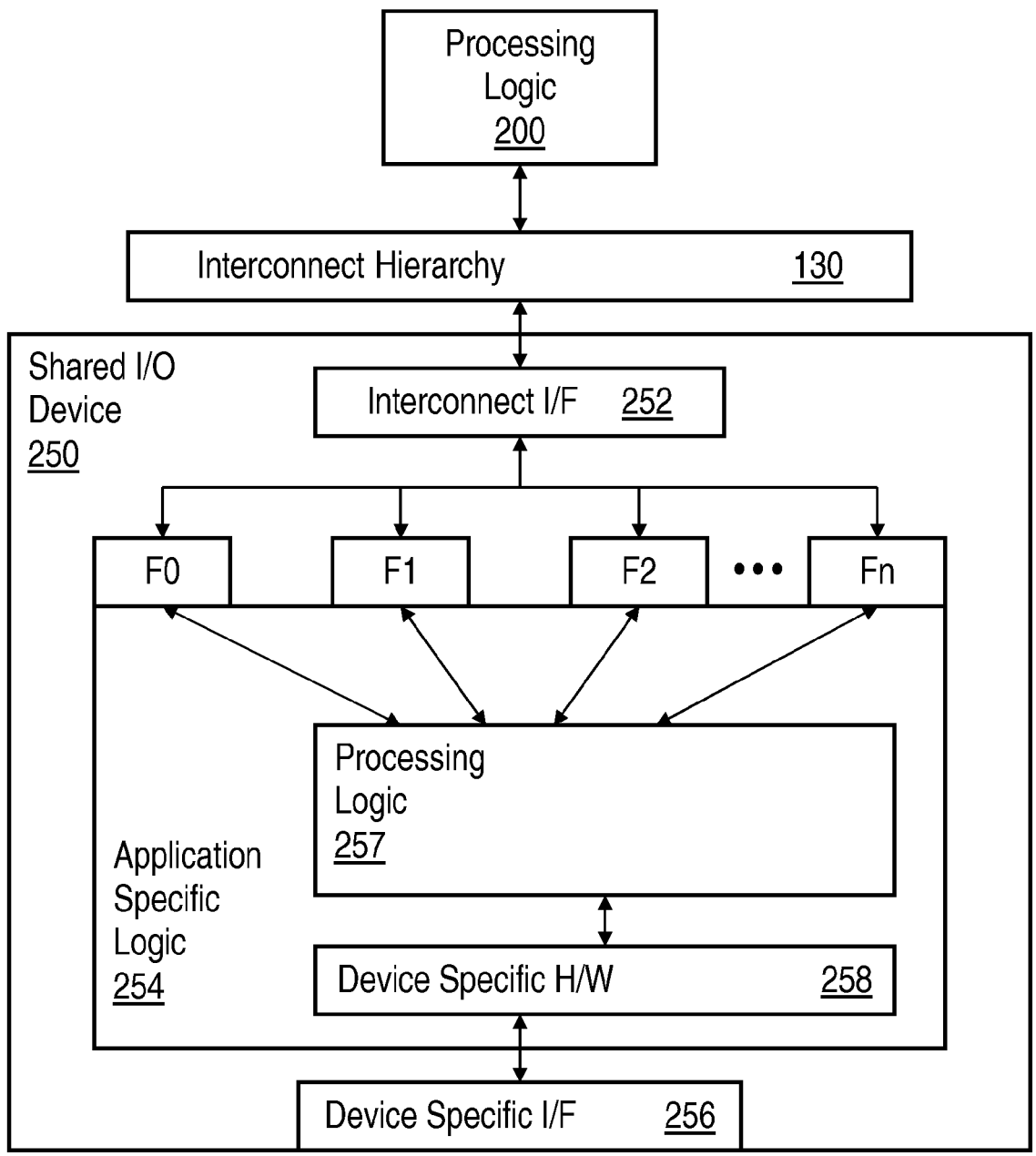
FIG. 3 shows a detailed block diagram of the multi-function shared I/O device of FIG. 1, constructed in accordance with at least some illustrative embodiments.

FIG. 3 shows a detailed block diagram of shared I/O device 250, constructed in accordance with at least some illustrative embodiments. Shared I/O device 250 includes interconnect interface (I/F) 252, which couples shared I/O device 250 to interconnect hierarchy 130. Interconnect I/F 252 also couples to application specific logic 254, which includes processing logic 257 and device specific hardware 258. Processing logic 257 implements at least some of the functionality of shared I/O device 250. Processing logic 257 may be implemented in hardware (e.g., as a programmable logic array), in software (e.g., as embedded firmware or microcode executing on a processor), or using a combination of both hardware and software. Processing logic 257 couples to interconnect I/F 252 and to device specific hardware 258, allowing processing logic 257 to expose the functionality of shared I/O device 250 to other hardware and software via interconnect hierarchy 130 (e.g., to the virtual machines executing on processor 210 of FIG. 1).

Shared I/O device 250 of the illustrative embodiment is shared among the multiple virtual machines by exposing what are sometimes referred to as "functions" of shared I/O device 250. Each function represents a set of capabilities exposed to other hardware and software via interconnect hierarchy 130. These capabilities may be the same for each function or different. A function appears on interconnect hierarchy 130 as if it were a distinct device with the capabilities defined for the function. In the context of a PCI-based system, for example, each function has a PCI device address associated with it. Although the illustrative embodiments described include hardware-based device functions, those of ordinary skill in the art will recognize that other illustrative embodiments may include virtualized device functions (e.g., the native virtual device functions described in the PCI Special Interest Group (PCI-SIG) Input/Output Virtualization (IOV) specifications), and all such device functions are within the scope of the present disclosure.

An address is assigned to a PCI-based device during bus initialization after a reset of the system (e.g., system 200 of FIG. 2), a process sometimes referred to as enumeration. During enumeration, the master of a PCI root complex scans the PCI bus to determine what devices are present, to determine what their capabilities are, and to assign an address to each identified device. In the illustrative embodiment of FIG. 2, processor 210 scans interconnect hierarchy 130 for devices coupled to the interconnect. When shared I/O device 250 is encountered, enumeration software (not shown) executing on processor 210, as part of the enumeration process, executes a PCI configuration write, which assigns an address to the device. One or more control bits of a control register within shared I/O device 250 (not shown) may be set during the configuration write, placing shared I/O device 250 in a "source latching" mode that causes the shared device to latch an identifier of the source of the write, as well as subsequent configuration writes after a reset, as described below.

When the above-described configuration write occurs after an interconnect reset (e.g., a bus-level hardware reset on a PCI bus), and the shared I/O device is configured in a source latching mode (either as a result of the current configuration write, or a previous configuration write), the source or originator of the write is identified and saved by the shared I/O device. In at least some illustrative embodiments, the source or originator of the write includes privileged software executing on processor 210. Such privileged software may include an operating system, a hypervisor operating system, or basic input and output system (BIOS) software. In the context of a PCI-based system, for example, the shared I/O device 250 of the illustrative embodiment saves the contents of an identification field within the PCI configuration write transaction, referred to as the request ID (RID) field. The RID field includes an identifier that uniquely identifies the source of the transaction (in this case processor 210) within the address space defined by the bus hierarchy of bus 130. By saving the RID of the configuration write to shared I/O device 250 after a system reset, the shared I/O device can use the RID field of subsequent transactions to authenticate the source of the transaction (e.g., a bus controller or privileged software).

Once privileged software executing on a processor (e.g., processor 210) and controlling the interconnect hierarchy (e.g., interconnect hierarch 130) causes shared I/O device 250 to latch the RID associated with the processor/privileged software, the privileged software may then associate one or more of the functions of shared I/O device with additional specific RIDs other than its own. The additional specific RIDs, once latched as described below, allow non-privileged access of each function as a distinct device that is only accessible by a source associated with the specific RID assigned to the function by the privileged software, or by the privileged software itself (via the latched RID of the privileged software). If, for example, shared I/O device 250 receives a transaction requesting access to a function of the device, but the RID field does not match the RID associated with that function (or the RID associated with the privileged software), the transaction is treated as an exception condition and not accepted. The transaction may simply be disallowed and ignored (resulting in a bus timeout) or an exception can be generated, flagging the attempted access as a security violation.

Because the privileged software is the first software to execute on processor 210 of FIG. 2, the privileged software "owns" the physical resources of system 100. The privileged software may be viewed as a "trusted" agent that allocates the physical resources of the system to other software applications (e.g., to the virtual machines of FIG. 1). The privileged software may configure and exercise control over each of the functions of shared I/O device 250 by one of several mechanisms. In at least one illustrative embodiment, each function restricts access to certain operations, registers, or memory regions (e.g., the PCI configuration space associated with a function of a PCI device) to only the privileged software (via the latched RID). In other illustrative embodiments (e.g., the embodiments show in FIGS. 1-3), function 0 is reserved as a supervisory function, accessible only by the privileged software (via the latched RID). While the privileged software may still access the other non-zero functions (e.g., to service exception conditions common to all functions), non-privileged software is blocked from accessing function 0. Function 0 thus allows the privileged software to perform supervisory operations without necessarily needing to access the other functions directly. These supervisory operations can include general control, configuration and status of shared I/O device 250, as well as control, configuration and status of the non-zero functions of the device.

The pairing up of processor 210 and function 0 of shared I/O device creates what is sometimes referred to as a "partition," in this case a supervisory partition. A partition is created by the pairing of two endpoints of the bus (here processor 210 and function 0 of shared I/O device 250). In at least some illustrative embodiments, the supervisory partition is unique for multi-function devices in that it includes not just function 0, but also all other non-zero functions. Other non-supervisory partitions are created by pairing other endpoints (e.g., virtual machines 112, 115 and 118 of FIG. 1) with other, non-zero functions of shared I/O device 250. When a non-zero function is associated by the privileged software with, for example, an RID assigned to one of the virtual machines of FIG. 1, the non-zero function is exposed within the virtual machine as a virtual device with a unique base function zero. Thus, referring to FIGS. 1 and 2, function 1 of shared I/O device 250 appears as function zero of virtual device 226 within virtual machine 112, and is coupled via virtual interconnect hierarchy 224 to virtual root complex 222. The creation of virtual root complexes within multiple virtual machines of system 100 may be viewed as a sharing of the real, physical root complex 230 of system 100. Driver 113 provides guest operating system 111 with an interface to virtual device 226. In this manner, function 1 of shared I/O device 250 is exposed to guest operating system 111 as a real, unshared device, as seen from the perspective of virtual machine 112. The pairing of the RID, assigned by the privileged software to virtual root complex 222, and function 1 of shared I/O device 250 defines a partition that is uniquely associated with virtual machine 112.

As already noted, the privileged software executing on processor 210 assigns RIDs to each virtual machine, which also execute on processor 210. In at least some illustrative embodiments, a range of RIDs are reserved by the privileged software when RIDs are initially assigned to each device by the privileged software (e.g., during the PCI enumeration process previously described). These RIDs are set aside for later use by virtual machines executing on processor 210. Transactions originating from each of the virtual machines (e.g., virtual machines 112, 115 and 118 of FIG. 1) may be presented on interconnect hierarchy 130 with the RIDs corresponding to a particular virtual machine (e.g., virtual machine 112 of FIG. 2) using one of several mechanisms. In at least some illustrative embodiments, processor 210 is capable of associating software applications executing on the processor with specific RIDs and, as part of a context switch between application, is capable of setting the value of the RID used by the real root complex (e.g., root complex 230 of FIG. 2) when transmitting transactions on interconnect hierarchy 130 (e.g., a PCIe bus). Examples of such processor include the vPro™, Xeon® and Itanium® processor families from Intel® (with Intel® Virtualization Technology or IVT, and sometimes referred to as the "Vanderpool" extensions), and the AMD64-based line of processors from Advanced Micro Devices® (with AMD-Virtualization™ or AMD-V™, sometimes referred to as the "Pacifica" extensions).

In at least some illustrative embodiments, processor 210 does not have the capability of changing the RID used by the real root complex when transmitting a transaction across interconnect hierarchy 130. In at least some such embodiments, at least one communication packet switch (e.g., a PCI Express switch) within the interconnect hierarchy 130 is configured by the privileged software to substitute the RID of a transaction originating from root complex 230 with another RID. The substituted RID is determined based upon the target device address or target ID (TID) of the transaction. If the TID corresponds to a device or a function of a device associated with a virtual machine as previously described, the original RID of the transaction will be replaced with the RID assigned to the virtual machine associated with the device or function. In this manner, the device or device function will receive a transaction with an RID that uniquely identifies the actual source of the transaction (e.g., virtual machine 112 of FIG. 2). In at least some illustrative embodiments, a communication packet switch capable of RID substitution as described (e.g., switch 135 of FIG. 2) is coupled to root complex 230 with no other intervening switches between the communication packet switch and the root complex. By coupling root complex 230 to switch 135 as shown in FIG. 2, transactions between processing logic 200 and interconnect 130 are exchanged by two "trusted" entities (i.e., root complex 230 and switch 135), each of which protect the integrity of the transaction (e.g., the validity of the RID and TID fields of a PCIe transaction).

As already noted, each virtual machine has a virtual device associated with it that provides access to interconnect hierarchy 130. Each virtual device represents an interconnect hierarchy endpoint, and has a unique address, and thus a unique request identifier, associated with it. Continuing to refer to FIGS. 1 and 2, in at least some illustrative embodiments, when a virtual machine is first executed on processor 210, one of the function codes of shared I/O device 250, previously associated with an RID assigned by the privileged software to the virtual root complex of the virtual machine as part of the configuration definition of the virtual machine, is accessed by the virtual machine as part of its own virtual bus initialization sequence. A configuration write is transmitted to the function code of the share I/O Device 250 designated as part of the configuration of the virtual machine, and as a result the function is assigned to the virtual machine.

For example, when virtual machine 112 is executed on processor 210, a virtual bus initialization sequence results in a configuration write transaction being issued to function code 1 of shared I/O device 250. In this example, function code 1 is designated as being part of the configuration of virtual machine 112. The configuration write results in the assignment of an address to function code 1 within the address space of interconnect hierarchy 130. This address is further mapped by driver 113 into the address space of the virtual bus of virtual machine 112. Because the configuration write to function 1 is the first write since a reset, the RID of the write transaction originated by virtual machine 112 is saved by shared I/O device 250, thus assigning function 1 uniquely to the RID of the virtual root complex of virtual machine 112. When subsequent transactions are sent to function 1, if the RID field of the transaction does not match the saved root complex RID for function 1 (i.e., the transaction did not originate from virtual machine 112), the transaction is not allowed and generates an exception (handled by the privileged software), as previously described.

Similarly, additional virtual machines can be associated with additional functions of shared I/O device 250. Because each function appears as a distinct device, each virtual machine operates as if it has its own, distinct I/O device with the functions defined for the function of shared I/O device 250 assigned to the corresponding virtual machine. Thus, the number of virtual machines that can be configured to concurrently use shared I/O device 250 is equal to the total number of functions available on shared I/O device 250, minus 1 (excluding supervisory function 0). Each association of a virtual machine with a function of the shared I/O device 250 defines a partition, with the partition number reflecting the number of the function (e.g., partition 3 is associated with the pairing of a virtual machine with function 3 of shared I/O device 250).

As already noted, in at least some illustrative embodiments a function code is associated with an RID (and thus a virtual machine) based upon the RID of the first configuration write after a reset. The reset may be either a general system reset, or a reset associated just with one function (sometimes referred to as a "function level reset" or FLR). An association of a function can be change in at least one of two ways: 1) the system is reset and all associations are cleared; or 2) a function level reset for a particular function is issued, and the RID-to-function association for that particular function is cleared. Once the association for a particular function is cleared (e.g., after shutting down the virtual machine previously associated with that function and issuing a function level reset of the function), the next configuration write to that function will create a new association, based upon the RID field of the configuration write transaction received after the FLR.

By restricting access to a given function of shared I/O device 250 to only transactions originating from virtual machines with RIDs that match the saved RID for the function, each function maintains isolation of the virtual machines as between resources outside of the confines of the virtual machine program itself, without the need for the hypervisor to monitor and intercept unauthorized transactions from one virtual machine to a resource allocated to another virtual machine. Isolation is maintained and enforced across the interconnect hierarchy with protocols that support hardware partitioning that is linked into the software stack (e.g., the privileged software within hypervisor host operating system 110 of FIG. 1). The resource (here shared I/O device 250) effectively polices its own received transactions in hardware, thus reducing the overhead associated with enforcing transaction isolation and security within the hypervisor software.

Further, hardware-based isolation and security enforcement at the resource also serves to extend the overall capabilities of a system incorporating the resource (e.g., system 100 of FIG. 1), by allowing secure operation of at least some resources of the system, even though other resources within the same system are not secure. Because the self-policing resource verifies all received transactions, it is not necessary that the transactions be intercepted and/or monitored by a hypervisor or other privileged software. Thus, unauthorized transactions outside the scope of protection of a hypervisor or other privileged software (e.g., transactions transmitted across intervening communication packet switches and bus hierarchy segments beyond the boundaries of root complex 230 of FIG. 1) are disallowed and not accepted by the self-policing resource acting as an endpoint within a bus hierarchy.

Figure 4:
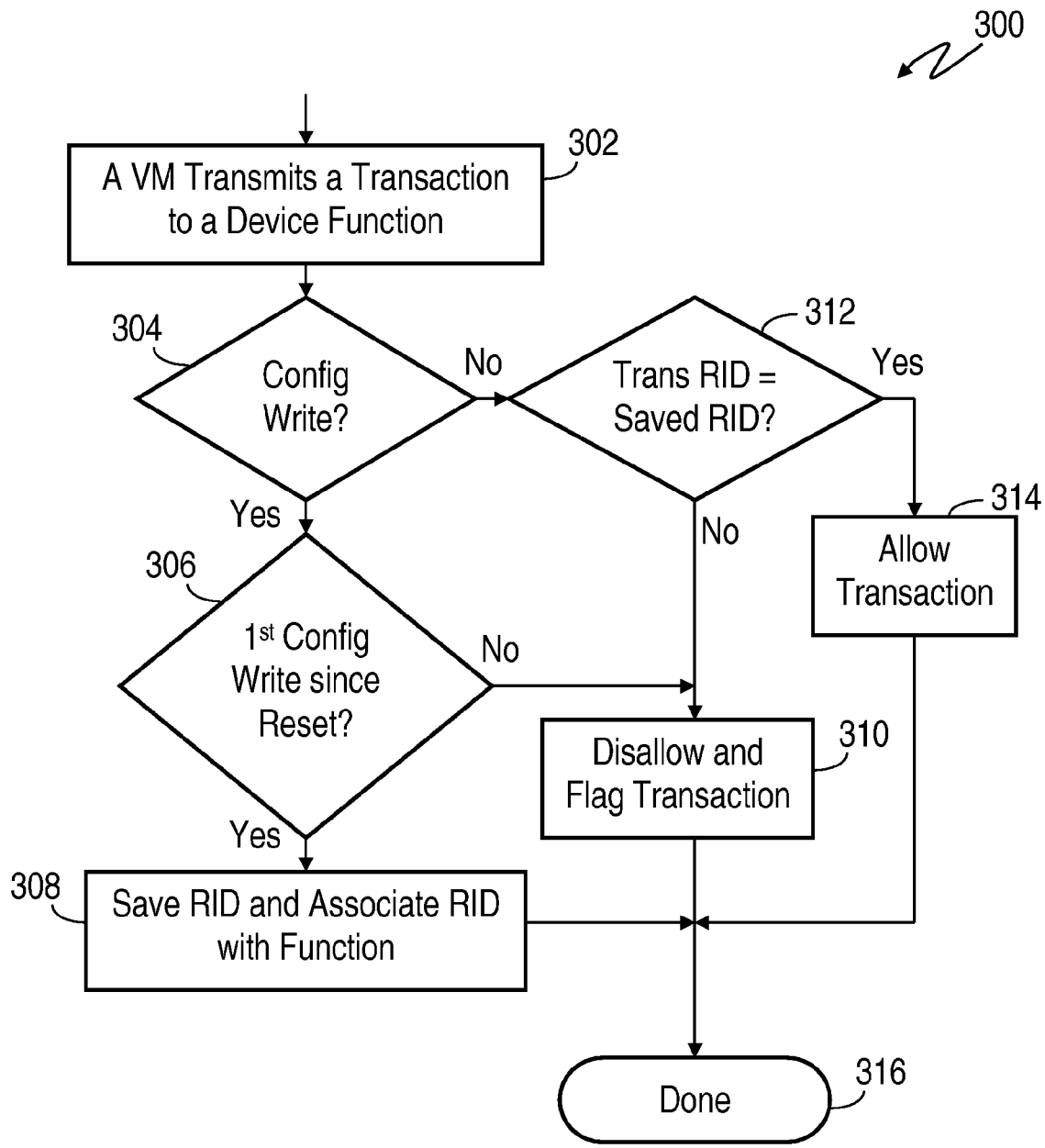
FIG. 4 shows a method for allocating and isolating device functions within a multi-function shared I/O device used by multiple virtual machines, in accordance with at least some illustrative embodiments.

FIG. 4 shows a method 300 for allocating and isolating functions within a shared, multi-function device, in accordance with at least some illustrative embodiments. A virtual machine transmits a transaction to a function of a shared device (block 302) and the transaction is checked to determine if the transaction is a configuration write transaction (block 304). If the transaction is a configuration write, and further if it is the first configuration write since either a system reset or a function level reset (block 306), the RID of the transaction is saved and the RID is associated with the function (block 308) ending the method (block 316). If the transaction is a configuration write (block 304) but it is not the first configuration write since a reset (block 306), the transaction is disallowed and flagged (block 310) ending the method (block 316).

If the transaction transmitted by the virtual machine is not a configuration write (block 304), and the transaction RID matches the RID previously saved for the function (block 312), the transaction is allowed (block 314), ending the method (block 316). If the transaction transmitted by the virtual machine is not a configuration write (block 304), but the transaction RID does not match the previously saved RID associated with the function (block 312), the transaction is disallowed and flagged (block 310), completing the method.

The above discussion is meant to be illustrative of the principles and various embodiments of the present invention. Numerous variations and modifications will become apparent to those skilled in the art once the above disclosure is fully appreciated. For example, although the described embodiments include single processor systems, the systems and methods described may also be implemented within multi-processor or even multi-host systems (e.g., blade servers). Further, although the illustrative embodiments are described within the context of a PCI-based system, the systems and method described may also be implemented using other bus and/or network switch fabric architectures that utilize transactions with unique source identifiers. Also, although the illustrative embodiments of the present disclosure describe associating RIDs, devices and device functions with virtual machine software programs, such associations are not limited to virtual machine software programs, and the RIDs, devices and device functions described may be associated with any software program executing on processing logic and processors such as those of the illustrative embodiments described. It is intended that the following claims be interpreted to embrace all such variations and modifications.

What is claimed is:

1. A device, comprising:
an interconnect interface;
a plurality of functions; and
processing logic, coupled to the interconnect interface, that provides access to the plurality of functions of the device through the interconnect interface;
wherein a first transaction request received by the device, and associated with configuring a function of the plurality of functions, causes a request identifier stored within the first transaction request to be assigned to the function of the plurality of functions of the device, but not to the device as a whole;
wherein the function is a supervisor function accessible only by a privileged software, and wherein if the first transaction request is received after either a device level or a function level reset, and is further received before any other transaction requests after the reset, the request identifier of the first transaction request is assigned to the supervisory function; and
wherein access to the function, but not to the device as a whole, is denied if a request identifier stored within a second transaction request, received subsequent to the first transaction request, does not match the request identifier assigned to the function.

2. The device of claim 1, wherein either the device or the function is reset before the device receives the first transaction request.

3. The device of claim 1, wherein the assignment of the request identifier stored within the first transaction request to the function cannot be changed without first executing either the device level or the function level reset.

4. The device of claim 1, wherein the device further comprises a bus interface configured to couple the interconnect interface to either a peripheral component interconnect express (PCI Express) bus, or an extended PCI (PCI-X) bus.

5. The device of claim 1, wherein the supervisory function is associated with a supervisory partition, and wherein all functions of the plurality of functions of device are associated with the supervisory partition.

6. The device of claim 1, wherein the supervisory function is designated with a function identifier of zero, and wherein all other functions of the device are designated with unique non-zero function identifiers.

7. A computer system, comprising:
a processor that executes a plurality of software programs;
a device comprising processing logic, wherein the processing logic permits access by the plurality of software programs to one or more of a plurality of functions of the device; and
an interconnect that couples the processor to the device;
wherein a first transaction request associated with configuring a function of the plurality of functions of the device, and transmitted from a first software program of the plurality of software programs, is transmitted to the device and causes a first request identifier stored within the first transaction request to be assigned to the function but not to the device as a whole;
wherein access to the function, but not to the device as a whole, is denied if a second request identifier stored within a second subsequent transaction request does not match the first request identifier; and
wherein the processor further executes a supervisory program and the function is a supervisory function; and
wherein the supervisory program transmits a transaction request to the device after either a device level or a function level reset and before an other transaction request is transmitted after the reset, and a request identifier stored within the transaction request from the supervisory program is assigned to the supervisory function.

8. The computer system of claim 7, wherein the second subsequent transaction request is transmitted from a second software program of the plurality of software programs.

9. The computer system of claim 7, wherein either the device or the function is reset before the first software program transmits the first transaction request.

10. The computer system of claim 7, wherein the assignment of the first request identifier to the first function cannot be changed without first executing either the device level or the function level reset.

11. The computer system of claim 7, wherein the interconnect is a peripheral component interconnect express (PCI Express) bus, or an extended PCI (PCI-X) bus.

12. The computer system of claim 7, wherein the supervisory function is associated with a supervisory partition, and wherein all functions of the plurality of functions of the device are associated with the supervisory partition.

13. The computer system of claim 7, wherein the supervisory function is designated with a function identifier of zero, and wherein all other functions of the plurality of functions of the device are designated with unique non-zero function identifiers.

14. The computer system of claim 7, further comprising a bridge coupled to the processor and to the interconnect, wherein the bridge sets the first request identifier to a value associated with the first software program.

15. The computer system of claim 14, wherein the bridge is a root complex.

16. The computer system of claim 7, wherein the interconnect comprises a communication packet switch, and wherein the communication packet switch sets the first request identifier to a value associated with the first software program.

17. The computer system of claim 7, wherein the software program comprises a virtual machine program.

18. A method, comprising:
a first software program transmitting, to a function of a plurality of functions of a device, a first transaction request comprising a first request identifier, wherein the first transaction request is transmitted after executing a reset and before transmitting any other transaction requests;
the device assigning the first request identifier to the function but not to the device as a whole;
a second software program transmitting to the function of the device a second transaction request comprising a second request identifier;
the device disallowing access by the second software program to the function, but not to the device as a whole, if the second request identifier does not match the first request identifier;
designating a supervisory function with a function identifier of zero, wherein the function comprising the supervisory function; and designating all other functions of the plurality of functions of the device with unique non-zero function identifiers.

19. The method of claim 18, further comprising executing either a device level or a function level reset before the transmitting of the first transaction request.

20. The method of claim 18, further comprising preventing the assigning of another request identifier to the function until after executing either a device level or a function level reset.

21. The method of claim 18, wherein the first and second software programs each comprises a virtual machine program.

* * * * *

UNITED STATES PATENT AND TRADEMARK OFFICE
CERTIFICATE OF CORRECTION

PATENT NO.         : 8,464,260 B2                                           Page 1 of 1
APPLICATION NO.    : 11/930854
DATED              : June 11, 2013
INVENTOR(S)        : Dwight D. Riley It is certified that error appears in the above-identified patent and that said Letters Patent is hereby corrected as shown below:

In the Claims:

In column 10, line 9, in Claim 7, delete "an" and insert -- any --, therefor.

Signed and Sealed this
Third Day of September, 2013

Teresa Stanek Rea
*Acting Director of the United States Patent and Trademark Office*